Sept. 17, 1929.　　　C. G. SHIELDS　　　1,728,372
TRANSMISSION MECHANISM
Filed July 8, 1926　　　2 Sheets-Sheet 1
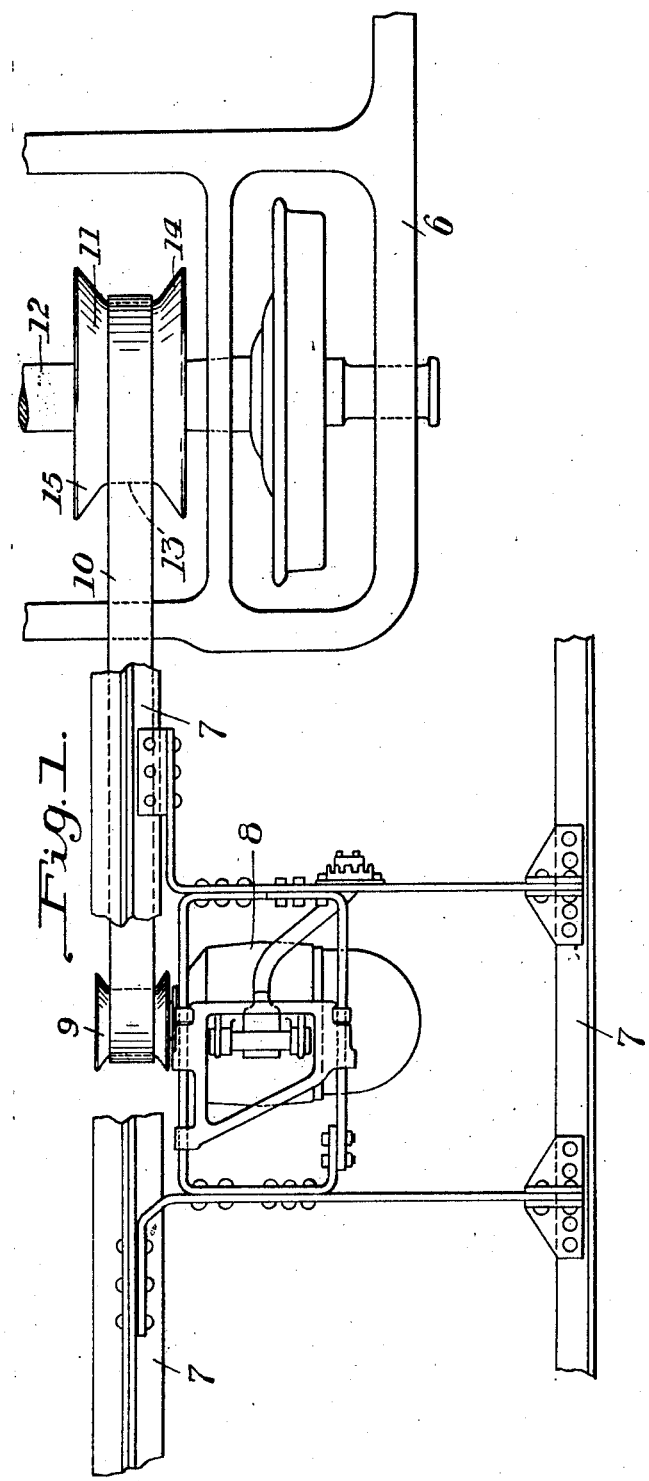
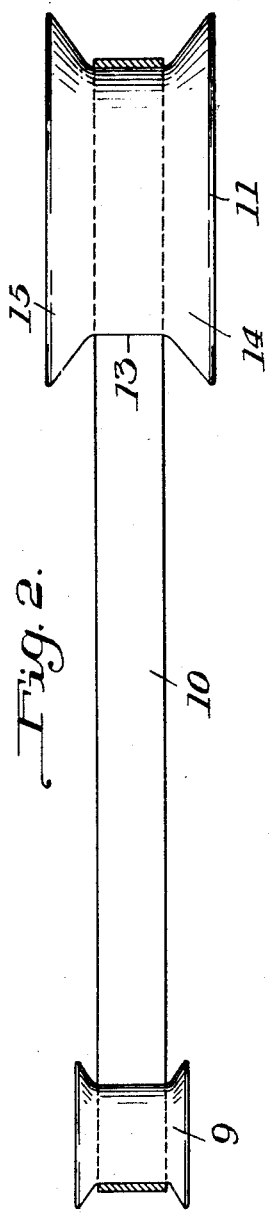
INVENTOR
Clarence G. Shields
By Archworth Martin,
Attorney

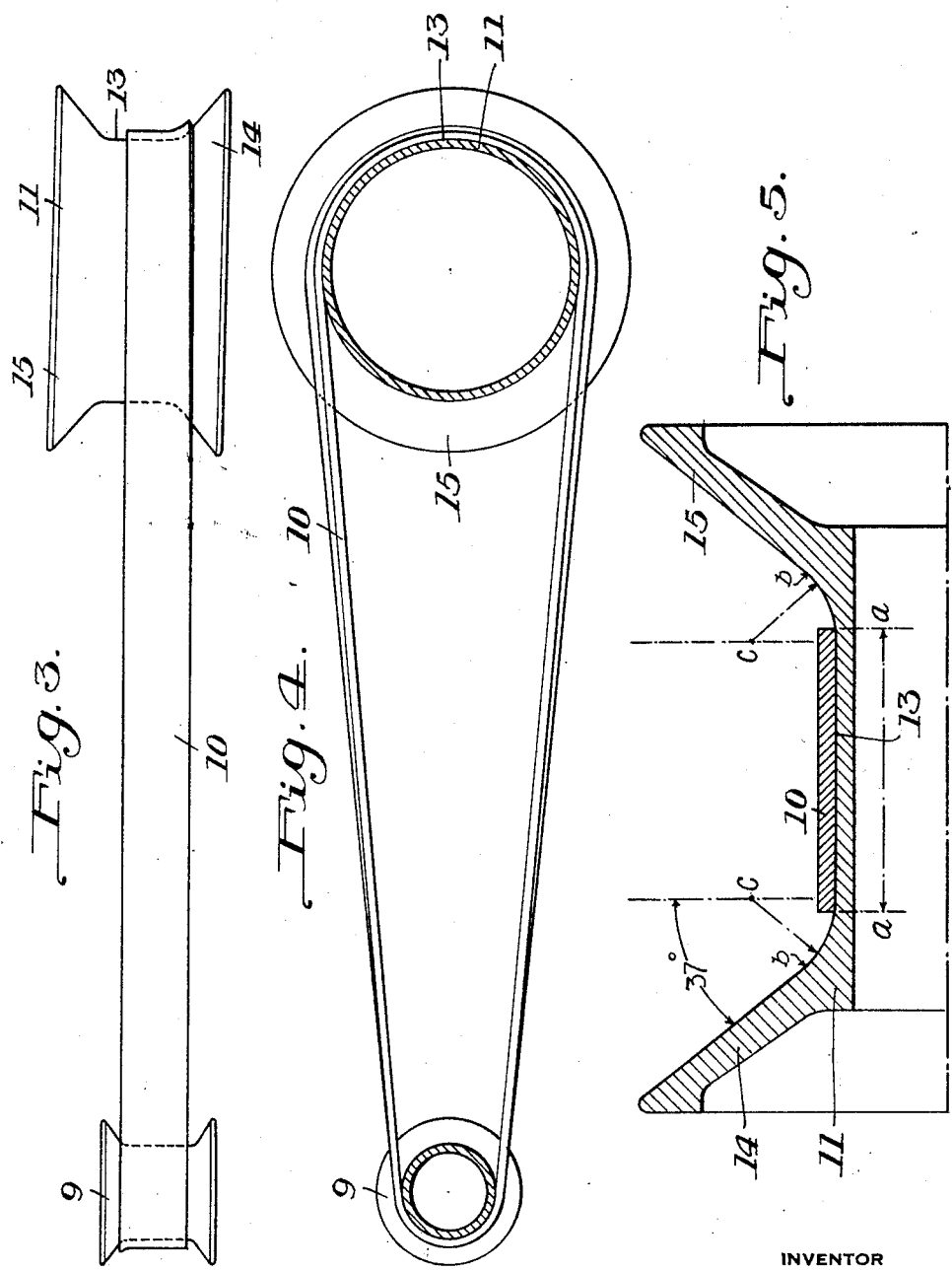

Patented Sept. 17, 1929

1,728,372

UNITED STATES PATENT OFFICE

CLARENCE G. SHIELDS, OF PITTSBURGH, PENNSYLVANIA

TRANSMISSION MECHANISM

Application filed July 8, 1926. Serial No. 121,111.

My invention relates to transmission mechanisms, and particularly to those of the pulley and belt type.

In the transmission of power from a pulley mounted upon a tilting or floating axis, to another pulley, by means of a flat belt, difficulty is experienced in maintaining the belt constantly under tension throughout its entire width, by reason of the fact that when one pulley tilts relatively to the other, one edge of the belt will be maintained under tension and the opposite edge will become slack. This results in excessive strain and stretching of the tight portion of the belt, as well as causing the same to slip, by reason of the reduced area of friction, with consequent non-uniform power transmission. Furthermore, the belt tends to slip off the pulley.

In some cases, wide-faced pulleys have been provided to prevent the belt from slipping off. In other cases, flanges have been provided on the edges of the pulleys, to hold the belt in position, but when the axis of one of the pulleys tilts relative to the axis of the other pulley, the edges of the belt are brought into frictional contact with the pulley flanges and become worn. Furthermore, the belt tends to rise on the flanges, by reason of a spiral climbing action, thus causing excessive stretching of the belt, and shortening the life thereof, by reason of the fact that the stretching action is confined largely to the edges of the belt. This is true even though the normal belt-engaging surface of the pulley is of the crown type, because it is impossible in actual practice to maintain the line of driving torque so centralized that the pulley will not tend to slip to one end or the other of the pulley.

My invention has for its object the provision of pulleys of such form that a flat belt will be maintained under uniform tension throughout substantially its entire width, notwithstanding tilting of one pulley relative to the other.

While my invention is capable of use in connection with various forms of apparatus wherein one pulley may have its axis angularly disposed or inclined relative to the axis of the other pulley, I herein show and describe it as particularly applicable to use in connection with train lighting systems, wherein it is the common practice to mount the driving pulley on a car axle that is carried by a swivel truck and the driven pulley is mounted upon the underframe of the car.

Apparatus embodying my invention is shown in the accompanying drawing wherein Fig. 1 is a plan view of a portion of a railway car equipped with an electric generator and driving mechanism therefor; Fig. 2 is a plan view, on an enlarged scale, of a portion of the apparatus of Fig. 1; Fig. 3 is a view similar to Fig. 2, but showing the position assumed by the belt when the car truck is turned slightly on its center pin; Fig. 4 is an elevational sectional view of mechanism of Fig. 3, and Fig. 5 is a transverse sectional view, on an enlarged scale, of the driving pulley of Figs. 1 and 2.

Referring to Fig. 1, I have shown a portion of a car truck 6 which may be of standard form and has the usual swivel connection through a center pin (not shown) with the car underframe structure 7. A generator 8 is secured to the underframe 7 in the usual manner and a driven pulley 9 is connected thereto. The pulley 9 is driven by a belt 10 which passes around a driving pulley 11 that is secured to the car axle 12.

It will be understood that as the car enters a curve the truck frame 6 will have swivel movement in a horizontal plane, relative to the car frame 8, and that the tension on one edge of the belt 10 will be decreased relative to the tension on the other edge of the pulley, by reason of the fact that the axis of the pulley 11 is moved to an angular position relative to the axis of the pulley 9. Therefore, the belt will tend to move toward one end of the pulley 11, as shown in Fig. 3, wherein the pulley 11 is shown as tilted in a clockwise direction.

The pulley 11 has an axially straight belt-engaging surface 13 that may be of substantially the width of the belt 10 and with which the belt normally engages throughout its width, but in order to take up the slack at the edges of the belt when the pulley 11 is tilted in one direction or the other, as indicated in Fig. 3, I provide a curved fillet at each side of the straight surface 13, which extends from $a$ to $b$. The curve of this fillet is struck from the center $c$ which is disposed between the vertical planes that define the ends $a$—$a$ of the pulley surface 13, so that a sharper angle will be produced at the point of juncture of the line $a$—$b$ with the line $a$—$a$, since if the center point $c$ were in vertical alinement with the point $a$ therebeneath, that portion of the curved surface $a$—$b$ which is adjacent to the surface $a$—$a$ would be so nearly parallel thereto that the belt would have considerable movement axially of the pulley before a substantial tightening effect were produced upon its edge portion.

The pulley 11 is provided with flange portions 14 and 15 having belt-engaging portions of conical form, the angle of the cone relative to the surface 13 of the pulley being shown as 37 degrees. The flanges 14 and 15, under abnormal conditions, serve to guide the belt and prevent it passing beyond the line $a$—$b$, as will appear in Fig. 3, wherein a portion of the belt is shown as engaging the flange 14.

When the belt has engaged one of the fillets as shown in Fig. 3, its outer edge is maintained under tension and there is little tendency for it to shift further toward the flange 14, since the swivelling movement of the truck is limited to a small amount in actual service, and there is consequently little, if any, abrading action by the pulley flange upon the edge of the belt. It will be understood that if some means such as a fillet were not provided for maintaining the relatively loose outer edge of the belt under tension, the belt would be shifted against and held in contact with the flange, with considerable force, by reason of the fact that the larger part of the driving torque would be confined to the tightening or inner edge of the belt, with consequent tendency to slippage, and that the outer edge of the belt, besides being subjected to excessive wear, would tend to climb the pulley flange.

It will be understood that the driven pulley 9 will preferably be of substantially the same form as the pulley 11 in that it will be provided with belt-retaining flanges and filleted portions, corresponding to the flanges 14 and 15 and the fillets $a$—$b$ of the pulley 11.

While the radius of the fillet $a$—$b$ may be varied relative to the diameter of the pulley, tests have shown that with a pulley whose normal belt-engaging surface is 18½ inches in diameter, satisfactory results are obtained by a fillet having a radius of 1¾ inches.

I claim as my invention:

1. Transmission mechanism comprising a flat belt, a driven pulley, and a driving pulley supported for angular movement relative to the driven pulley, the normal tractive face of the driving pulley being substantially straight in an axial direction, and the said pulley being provided with curved belt-engaging surfaces at each edge of said tractive face, said surfaces lying in a curve struck from a point within the lateral boundaries of said tractive face.

2. A power transmission member, comprising a pulley having a main belt-engaging surface that lies in straight lines axially and provided with an additional belt-engaging surface adjacent to one end thereof, said additional surface being in the form of a curve drawn from a center that is radially removed from the circumference of the pulley, and located within the lateral boundaries of the first named belt-engaging surface.

In testimony whereof I, the said CLARENCE G. SHIELDS, have hereunto set my hand.

CLARENCE G. SHIELDS.